(No Model.)
A. NOTEMAN.
PROCESS OF PRODUCING INFLAMMABLE GASES.
No. 468,956. Patented Feb. 16, 1892.
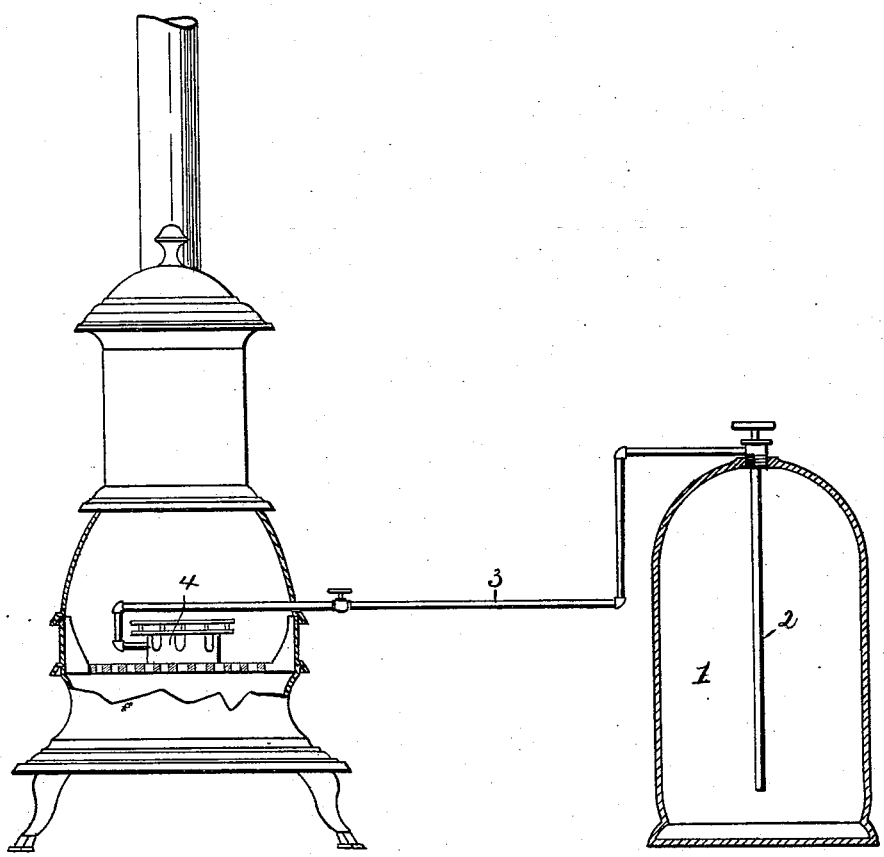

UNITED STATES PATENT OFFICE.

ALONZO NOTEMAN, OF TOLEDO, OHIO, ASSIGNOR TO HIMSELF, SAM T. FISK, AND WILLIAM WEBSTER, OF SAME PLACE.

PROCESS OF PRODUCING INFLAMMABLE GASES.

SPECIFICATION forming part of Letters Patent No. 468,956, dated February 16, 1892.

Application filed November 2, 1891. Serial No. 410,583. (No model.)

*To all whom it may concern:*

Be it known that I, ALONZO NOTEMAN, of Toledo, county of Lucas, and State of Ohio, have invented certain new and useful Improvements in a Process of Producing Inflammable Gases; and I do hereby declare that the following is a full, clear, and exact description of the invention, which will enable others skilled in the art to which it appertains to make and use the same, reference being had to the accompanying drawing, and to the figures of reference marked thereon, which forms part of this specification.

My invention relates to the process of producing an inflammable gas.

The object of this invention is to produce a combustible gas, and I accomplish this object by subjecting to sufficient heat a hydrocarbon oil commingled or impregnated with carbon dioxide, thus breaking up the latter and liberating one atom of oxygen, which enters into combination with the elements of the former.

In the drawing, the figure is a diagrammatic view of one form of mechanical apparatus for carrying out my process, and illustrates in vertical section a vessel for containing the prepared hydrocarbon oil and the internal pipe for utilizing the expansion of the same to cause an even flow to the burner contained within the combustion-chamber of a stove shown in elevation, a part being broken away to disclose the burner.

In carrying out my process I partially fill with petroleum-oil a receptable capable of being tightly closed and then incorporate the amount of carbon dioxide that will impregnate or commingle intimately with the oil.

In the performance of my process it is of course immaterial whether I employ one form of apparatus or another, it being only required that the oil shall be properly commingled or impregnated with the carbon dioxide and sufficiently heated to produce a combustible gas.

In the apparatus I have described it is probable that the gas is formed in the burner and that the feed-pipe which passes over the burner simply operates to partially heat the oil and carbon dioxide.

In using an ordinary gas apparatus for producing the gas the retort will be heated sufficiently to cause a breaking up of the carbon dioxide and the gas then conveyed therefrom to a suitable reservoir. The essential step is therefore that the mixture shall at some point between the reservoir and the place of final use or storage of the gas be subjected to that degree of heat which will cause the chemical changes necessary to produce the desired product.

If it is desired to use the oil in immediate combustion, I employ a portable tank 1, formed similar to the ordinary soda-fountain and provided with a tube or pipe 2, which screws into the top of the tank and extends to near the bottom thereof, the outer end of the pipe being formed for attachment to a pipe 3, which extends into the stove, preferably over the burner 4, and is connected therewith.

The operation of the particular apparatus shown by me is as follows: The pipe 3 is unscrewed, the tank nearly filled with oil, and a quantity of dioxide introduced into the tank to create a pressure sufficient to force the commingled oil and carbon dioxide out of the tank through the pipe 3 to the burner, where the gas produced therefrom is ignited.

It will be apparent that I may employ tanks of any size and pipe the charged oil therefrom to a plurality of burners or from a central supply-tank and afterward heat the same to a degree to form a gas and pipe the gas to consumers.

What I claim is—

1. The process of producing a combustible gas, which consists in heating a hydrocarbon oil commingled with carbon dioxide.

2. The process of producing a combustible gas, which consists in commingling a hydrocarbon oil with carbon dioxide and in heating said oil and carbon dioxide by the flame of their own gas.

3. The process of producing a combustible gas, which consists in heating a hydrocarbon oil impregnated with carbon dioxide.

4. The process of producing a combustible gas, which consists in impregnating a hydrocarbon oil with carbon dioxide and in heating said oil and carbon dioxide by the flame of their own gas.

In testimony that I claim the foregoing as my own I hereby affix my signature in presence of two witnesses.

ALONZO NOTEMAN.

Witnesses:
WILLIAM WEBSTER,
CARROLL J. WEBSTER.